Sept. 8, 1942.  S. B. GRISCOM  2,295,398
ELECTRICAL PROTECTIVE DEVICE
Filed Dec. 28, 1939
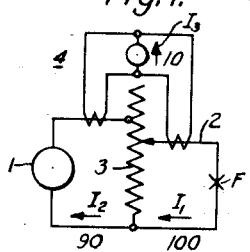
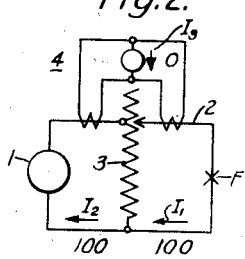
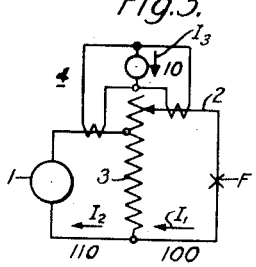
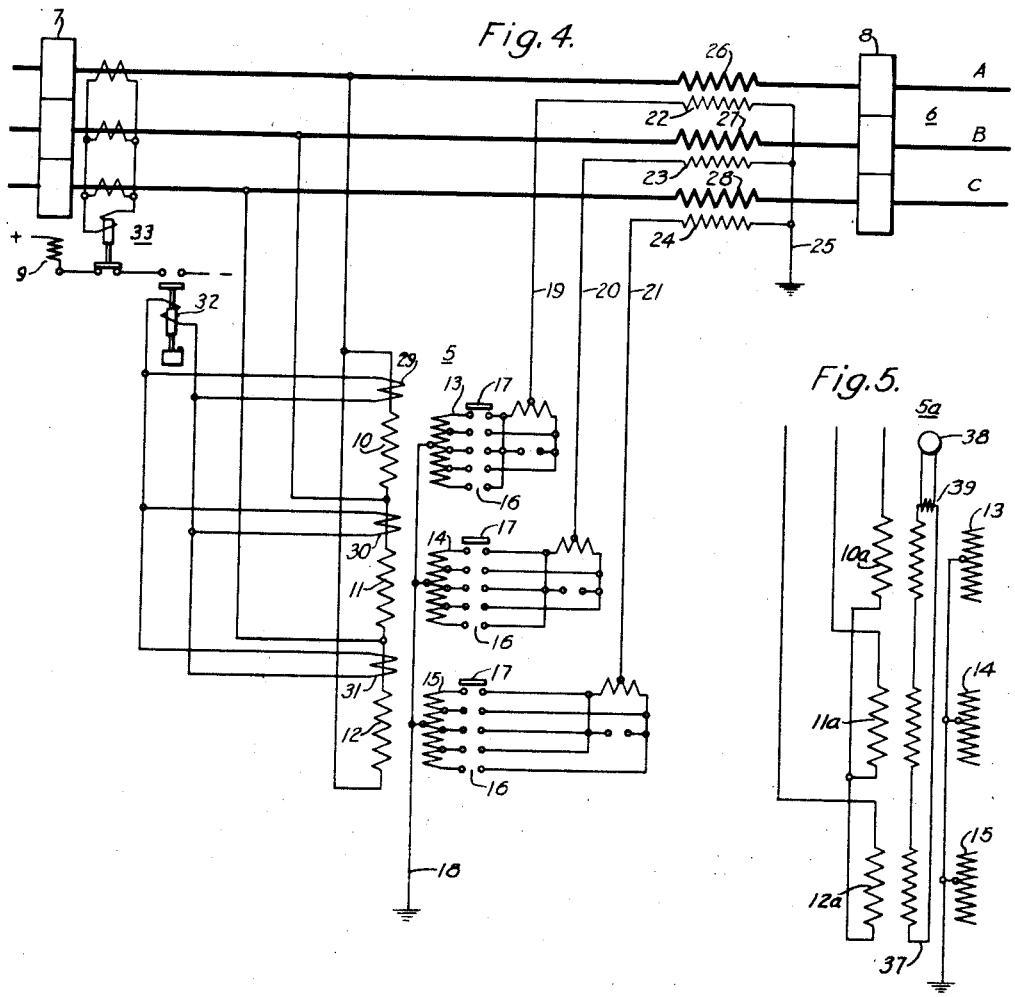
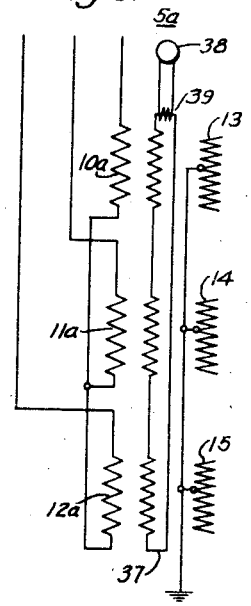
WITNESSES:
INVENTOR
Samuel B. Griscom
BY
ATTORNEY Patented Sept. 8, 1942

2,295,398

UNITED STATES PATENT OFFICE 2,295,398

ELECTRICAL PROTECTIVE DEVICE

Samuel B. Griscom, Wilkinsburg, Pa., assignor to Westinghouse Electric & Manufacturing Company, East Pittsburgh, Pa., a corporation of Pennsylvania Application December 28, 1939, Serial No. 311,335

9 Claims. (Cl. 175—294)

This invention relates to protective systems for electrical equipment, and it has particular relation to a protective system for electrical circuits employing regulating transformers.

The invention will be described with reference to the accompanying drawing, in which:

Figures 1, 2 and 3 are diagrammatic views showing a regulating transformer having differential relay protection under various conditions of operation;

Fig. 4 is a diagrammatic view showing one embodiment of my invention; and

Fig. 5 is a diagrammatic view showing a modified form of the system illustrated in Fig. 4.

In electrical systems the protection of electrical apparatus against internal faults is of extreme importance. The importance of this problem may be realized when the operating conditions of a complicated electrical system are considered. If an internal fault should occur on one of a plurality of pieces of electrical apparatus associated with an electrical system, continuous operation of the system may be possible if the defective apparatus is removed promptly from service. For example, if a plurality of transformers or generators are employed for energizing an electrical system, an internal fault on any one of the generators or transformers will not interrupt the continuity of service if the single faulty unit is promptly removed. Under these circumstances, the remaining generators or transformers would carry the load.

One of the most popular forms of relaying employed for protecting electrical apparatus against internal faults is that known as differential protection. Although differential relaying systems are giving excellent protection where properly employed, they are not entirely satisfactory for certain types of electrical equipment subject to variable operating conditions. As representative of this class of apparatus, a regulating transformer will be considered.

In Figs. 1, 2 and 3, a generator 1 is connected to a load circuit 2 through a regulating transformer 3. The regulating transformer may be employed either for phase regulation or voltage regulation or for both phase and voltage regulation. For the purpose of this preliminary discussion, however, the case of a voltage regulating transformer alone will be considered.

Should a fault F occur on the load circuit 2, the distribution of currents in the associated circuits is dependent upon the condition of the regulating transformer 3. To provide a clear basis for comparison, it will be assumed that the same current flows through the fault in each of the cases illustrated in Figs. 1, 2 and 3, and this current $I_1$ will be assumed further to have a value of 100 amperes. The direction of current flow is illustrated in all the figures as occurring at a single instant.

In Fig. 1 the regulating transformer 3 is illustrated as adjusted to a step-down condition wherein the regulating transformers step down the voltage of the generator 1 by 10%. A plus or minus variation of 10% in regulating transformers is not uncommon. Because of this ratio of transformation, the current $I_2$ on the generator side of the regulating transformer will have a value of 90 amperes. If a differential relay 4 is employed for protecting the regulating transformer 3 against internal faults, it follows that a current $I_3$ proportional to the difference between the fault and generator currents, which is 10 amperes in the case of Fig. 1, must flow through the differential relay.

Should the regulating transformer 3 be adjusted, to have no effect on the voltage supplied by the generator 1, it follows that the generator circuit current must be substantially equal to the fault current. As illustrated in Fig. 2, the fault current $I_1$ and the current $I_2$ on the generator side of the regulating transformer 3 are equal, and both have a value of 100 amperes. Since these currents are equal, no difference current $I_3$ flows through the differential relay 4.

In Fig. 3 the regulating transformer 3 is illustrated in its step-up condition wherein the generator voltage is stepped up 10%. Because of this transformer ratio, the generator current $I_2$ has a value of 110 amperes, the fault current being assumed constant at 100 amperes. Consequently a difference current $I_3$ proportional to the difference between the fault current $I_1$ and the generator current $I_2$ or 10 amperes will flow through the differential relay 4.

From a consideration of Figs. 1, 2 and 3, it will be noted that the difference current flowing through the differential relay may vary over a range of 10% of the current flowing through the load circuit 2 under normal operating conditions. When a fault occurs on the load circuit 2, the fault current may reach a value of 25 times the full load current. This means that under normal operating conditions the differential relay must be expected to carry an operating current proportional to 10% of 25 or 2½ times the full load current without operating. Since it is customary to provide a differential relay with a margin of safety in its setting, the differential relay employed in Figs. 1, 2 and 3 would require a setting of approximately 4 times full load current. Such a setting would be entirely too insensitive for most electrical installations.

In accordance with my invention, electrical apparatus subject to variable operating conditions, such as a regulating transformer, is provided with a relay responsive only to residual or resultant current taken by the electrical apparatus. In the case of a regulating transformer having a delta-connected primary winding, a separate current transformer may be employed inside the delta for each of the phase-windings. The secondaries of the three current transformers may have their terminals connected in parallel. Because of the parallel connection, symmetrical currents such as positive phase-sequence and negative phase-sequence currents form closed systems in the current transformer secondary circuit and provide no resultant or residual current. Should the symmetrical relationship of the impedances of the phase-windings be disturbed, as by the occurrence of a fault between turns of one of the phase-windings, a resultant or residual current flows which is employed for actuating a protective relay. Similar protection may be afforded in the case of other connections of the regulating transformer, as will be pointed out in the following description.

Under some conditions of connection of a regulating transformer to an electrical system, a through fault occurring on the electrical system may give rise to a zero phase-sequence or circulating current in the delta winding of the regulating transformer. In order to preclude a false operation of the protective relay under these conditions, I provide a lock-out relay responsive to zero phase-sequence currents in the electrical system for rendering the protective relay ineffective.

It is, accordingly, an object of my invention to provide an improved protective system for electrical circuits employing electrical apparatus subject to variable operating conditions.

It is a further object of my invention to provide an improved system for protecting regulating transformers against internal faults.

It is another object of my invention to provide a protective relay system responsive to a deviation of the phase impedances of a polyphase electrical unit from a symmetrical relationship.

It is another object of my invention to provide a protective system for a regulating transformer responsive to a resultant or residual current flowing in the regulating transformer.

It is still a further object of my invention to provide a protective system for a regulating transformer which is responsive to zero phase-sequence currents flowing in the transformer, and which includes a lock-out relay responsive to zero phase-sequence currents flowing in an electrical circuit with which the regulating transformer is associated.

Other objects of my invention will be apparent from the accompanying drawing taken in conjunction with the description herein presented.

In Fig. 4 a regulating transformer 5 is associated with an electrical circuit 6. This electrical circuit is illustrated as a three phase alternating current circuit having three phase conductors A, B and C. One or more circuit breakers 7 and 8 may be included in the electrical circuit 6 for disconnecting the regulating transformer from the electrical circuit. The circuit breakers may have suitable trip coils, one trip coil 9 being illustrated for the circuit breaker 7.

The regulating transformer 5 includes three primary phase-windings 10, 11 and 12 which are connected in delta for energization from the electrical circuit 6. In addition the transformer is provided with a star-connected secondary comprising phase-windings 13, 14 and 15. With each of the secondary windings a plurality of switch contacts 16 is associated for controlling the adjustment of the regulating transformer in a manner well known in the art. The switch contacts 16 may be closed by suitable switch members 17, only three of which are illustrated in Fig. 4. It will be noted that the star-connected secondary windings 13, 14 and 15 are provided with a grounded neutral 18.

Through suitable conductors 19, 20 and 21 the adjustable secondary windings of the regulating transformer are connected to the primary phase-windings 22, 23 and 24 of a series transformer. The primary windings of the series transformer are illustrated as connected in star with a grounded neutral 25. The series transformer also includes a plurality of secondary windings 26, 27 and 28 which are illustrated as included in the phase conductors A, B and C of the electrical circuit 6.

In order to protect the regulating transformer 5 against the occurrence of internal faults, three current transformers 29, 30 and 31 are connected inside the delta primary winding, a separate current transformer being associated with each of the primary phase-windings. As illustrated in Fig. 4, the secondaries of the current transformers are connected in parallel to a protective relay 32.

The operation of the system thus far described may now be set forth. Under normal conditions of operation, the phase impedances of the delta-connected primary are symmetrical, and the currents flowing therein consist of balanced systems of positive and negative phase-sequence components. Since the current transformers 29, 30 and 31 have their secondaries connected in parallel relative to these balanced systems of phase-sequence components, it follows that these systems provide no resultant or residual current for the protective relay 22.

However, should the symmetry of the phase impedances be disturbed, as by the occurrence of a fault between turns of one of the phase-windings 10, a resultant or residual current flows which actuates the protective relay 32. This protective relay may be employed for connecting the trip coils of one or more of the circuit breakers to a source of energy for tripping purposes. As illustrated, the protective relay 32, in closing, connects the trip coil 9 to a source of direct current.

The operation of the protective relay 32 may be clarified by a more detailed description of its operation. As above indicated, the secondaries of the current transformers are connected in star relative to any balanced phase-sequence component of the polyphase currents flowing in the primary winding. Consequently none of these balanced phase-sequence components can produce a resultant or residual current for actuating the relay 32. Assuming that a fault occurs between turns of the phase winding 10, the resulting phase-impedance thereof is decreased. Because of the resulting dissymmetry of the windings, a residual or resultant current will flow to actuate the protective relay 32, the secondaries of the current transformers being in parallel relationship relative to this residual current.

A rough presentation of the theory may assist in visualizing exactly what occurs. Since the phase impedance of the winding 10 is decreased, it draws an appreciable current from the phase across which it is connected. Since the phase impedances of the windings 11 and 12 are substantially unchanged, no compensating variations in the currents flowing through the phase impedances 11 and 12 occur to compensate for the additional current taken by the phase-winding 10. Consequently additional current appears in the secondary of the current transformer 29 and is not balanced by currents in the secondaries of the remaining two current transformers. Because of this unbalance, the current in the current transformer 29 results in an operation of the protective relay 32.

The specific connections of the regulating transformer have been selected purposely to show another aspect of my invention. If the electrical circuit 6 is grounded on both sides of the regulating transformer upon the occurrence of a through-fault therein, a zero phase-sequence current may flow through the electrical circuit.

The zero phase-sequence current flowing in the electrical circuit 6, with the connections as illustrated, would produce a zero phase-sequence current circulating in the delta primary winding of the regulating transformer. Since the current transformers 29, 30 and 31 are in parallel, relative to the zero phase-sequence current, it follows that such a current would actuate the protective relay 32. Since the energization of the protective relay, in this instance, is caused by a through-fault rather than an internal fault of the regulating transformer, there is no need for a removal of the regulating transformer 5 from service. In order to preclude such removal, I provide an auxiliary lock-out relay 33 which is connected to the electrical circuit 6 through current transformers connected in star to respond only to zero phase-sequence current flowing in the electrical circuit 6.

When a through ground-fault which produces zero phase-sequence current occurs on the electrical circuit 6 both of the relays 33 and 32 tend to operate. By providing the relay 32 with a slight delay, the lock-out relay 33 operates first to open its back contacts. Consequently when the protective relay 32 operates to close its front contacts, the trip coil 9 is not affected, the tripping circuit being open at the relay 33.

Some zero phase-sequence current may flow in the electrical circuit 6 in response to a fault occurring in the regulating transformer 5. However, this zero phase-sequence current is small compared to the zero phase-sequence current flowing in response to a through ground-fault. For this reason it is a simple matter to adjust the relay 33 to respond to zero phase-sequence currents having values above those produced by an internal fault in the regulating transformer 5. With such a setting of the relay 33, the protective relay 32 is effective for protecting the regulating transformer 5 against internal faults.

When the connections of the electrical circuit 6 are such that no zero phase-sequence currents are produced therein under through-fault conditions, the lock-out relay 33 may be omitted.

The connection of the regulating transformer 5 to the electrical circuit 6 is subject to considerable variation. With the connections illustrated, a phase adjustment as well as a voltage adjustment is provided by the regulating transformer. By suitably varying the connections, the regulating transformer may be employed for regulating only voltage or only phase as desired.

Reference is made herein to zero phase-sequence currents. The phase-sequence or symmetrical component method of analysis is well known in the art. As generally understood, zero phase-sequence current is equal to ⅓ of the residual current or ground current flowing in the circuit. That is, the residual current is broken up into three equal parts because of the assumption that the residual current divides equally among the phase conductors of a three phase electrical circuit.

In Fig. 5, I have illustrated a modification of the system shown in Fig. 4. In Fig. 5 a regulating transformer 5a is provided with three phase-windings 10a, 11a and 12a connected in star with ungrounded neutral. The secondary of the regulating transformer 5a is made up of the three windings 13, 14 and 15 illustrated in Fig. 5. In addition, the regulating transformer of Fig. 5 includes a delta-connected tertiary winding 37 for stabilizing the neutral of the star-connected windings. With the connections illustrated, the delta-connected tertiary winding carries no current under normal balanced conditions of operation. The only current flowing in the delta-connected tertiary is a residual or zero phase-sequence current. If desired, protection may be afforded the transformer by connecting a relay 38 for energization in accordance with the total current flowing in the delta-connected tertiary winding 37. This energization may be through a current transformer 39 associated with the tertiary circuit. Since the only current flowing in the delta-connected tertiary is a zero phase-sequence current or residual current, it follows that the energization of the relay 38 will be somewhat similar to the energization of the relay 32. Consequently these relays may be employed for protecting the regulating transformers as illustrated in Figs. 4 and 5. If necessary, the relays may be so designed that they do not respond to any small harmonic frequency currents present.

It should be noted that the relays 32 and 38 discriminate between substantially no current and a residual current. Consequently they may be adjusted for reasonably sensitive operation.

Besides permitting the relay 33 to operate first, the time delay on the protective relay 32 may provide a short delay to permit the decay of transients caused by momentary unbalance of the transformer phase impedances during switching operations or for other reasons.

My invention has been incorporated in a commercial regulating transformer illustrated and described in the Electric Journal for March, 1939, pages 87 and 88, published by the Westinghouse Club, Wilkinsburg, Pa.

Although I have described my invention with reference to certain specific embodiments thereof, I do not wish my invention to be restricted except as required by the accompanying claims when interpreted in view of the prior art.

I claim as my invention:

1. In an electrical system, a polyphase regulating transformer including a plurality of closed phase-windings, said phase-windings having a predetermined, normal, symmetrical impedance relationship, a polyphase electrical circuit electrically connected to said transformer, means responsive to a deviation of said phase-windings from said normal, symmetrical impedance relationship, said means including a translating unit, and means responsive to the resultant of electrical currents traversing said phase-windings for effectively energizing said translating unit, and means responsive to a zero-phase sequence quantity in said electrical circuit for rendering said translating unit ineffective for response to said energizing means.

2. In an electrical protective system, a polyphase electrical circuit, a polyphase alternating current device connected for energization from said circuit, translating means, means responsive to a zero-phase-sequence quantity in said device for energizing said translating means, and means responsive to a zero phase-sequence quantity in said circuit for rendering said translating means unresponsive to said energizing means.

3. In an electrical system, a polyphase alternating current device having a plurality of phase impedances connected in a closed loop, translating means, separate means for deriving a first current substantially proportional to the current flowing through each of said phase impedances, a polyphase electrical circuit electrically connected to said device, means responsive to the resultant of said first currents for effectively energizing said translating means, and means responsive to a zero-phase sequence quantity in said circuit for rendering said translating means ineffective for response to said energizing means.

4. In an electrical system, a polyphase electrical circuit, a polyphase regulating transformer connected for energization from said circuit, circuit breaker means connecting said transformer to said electrical circuit, means responsive to a zero phase-sequence quantity in said regulating transformer for tripping said circuit breaker means, and means responsive to a zero phase-sequence quantity in said electrical circuit for rendering said circuit breaker means unresponsive to said tripping means.

5. In an electrical system, a three phase alternating current circuit, means for regulating said alternating current circuit including a regulating transformer, circuit breaker means connecting said alternating-current circuit to said regulating transformer, said regulating transformer having three phase-windings connected in delta as a primary for energization from said alternating current circuit, three current transformers, each of said transformers being associated with a separate one of said phase windings inside said delta for energization therefrom, means connecting the outputs of said current transformers for providing a resultant quantity dependent on a zero phase-sequence quantity in said delta-connected primary, means responsive to said resultant quantity for tripping said circuit breaker, and means responsive to a zero phase-sequence quantity in said alternating current circuit for rendering said circuit breaker means ineffective for a tripping operation by said tripping means.

6. In an electrical system, a polyphase transformer having a star-connected primary winding, a secondary winding and a delta-connected tertiary winding, a polyphase circuit electrically connected to said transformer, translating means responsive to a condition wherein a residual current flows in said delta-connected tertiary winding, and means responsive to a zero-phase sequence quantity in said polyphase circuit for rendering said translating means ineffective for response to said condition.

7. In a polyphase electrical system, a polyphase alternating current device having a variable ratio of input current relative to output current under normal conditions of operation, a polyphase circuit electrically connected to said device, and means for protecting said device against internal faults comprising translating means, means responsive to the resultant of currents flowing in said device for effectively energizing said translating means, and means responsive to a zero-phase sequence quantity in said polyphase circuit for rendering said translating means ineffective for response to said energizing means.

8. In a polyphase electrical system, a regulating transformer having phase impedances connected in a closed loop, a polyphase electrical circuit electrically connected to said transformer, circuit breaker means for controlling the connection of said transformer to said electrical circuit, translating means responsive to resultant current flowing around said loop for tripping said circuit breaker, and control means responsive to a zero-phase sequence quantity in said electrical circuit for rendering said translating means ineffective to trip said circuit breaker, said translating means having a time delay in operation greater than the time delay of said control means.

9. In a three-phase alternating-current system, a three-phase alternating-current device having three phase windings connected in delta, translating means, separate current transformer means for deriving a first current substantially proportional to the current flowing through each of said phase impedances, means responsive to the resultant of said first currents for effectively energizing said translating means, a three-phase electrical circuit electrically connected to said device, the connection of said electrical circuit providing a path for the flow of a zero-phase sequence quantity from said electrical circuit to said phase windings, and means responsive to the presence of said zero-phase quantity in said electrical circuit for rendering said translating means ineffective for response to said energizing means.

SAMUEL B. GRISCOM.